United States Patent [19]
Arold

[11] Patent Number: 5,256,104
[45] Date of Patent: Oct. 26, 1993

[54] MULTI-PART HOUSING OF A HEATING OR AIR-CONDITIONING SYSTEM IN A MOTOR CAR

[75] Inventor: Klaus Arold, Sindelfingen, Fed. Rep. of Germany

[73] Assignee: Mercedes-Benz AG, Fed. Rep. of Germany

[21] Appl. No.: 928,756

[22] Filed: Aug. 13, 1992

[30] Foreign Application Priority Data

Aug. 13, 1991 [DE] Fed. Rep. of Germany ....... 4126713

[51] Int. Cl.$^5$ ................................ B60H 3/06
[52] U.S. Cl. ................... 454/158; 55/473; 55/502
[58] Field of Search ............. 454/143, 146, 147, 148, 454/158; 55/467, 473, 502, DIG. 29

[56] References Cited

U.S. PATENT DOCUMENTS

| | | | |
|---|---|---|---|
| 3,470,679 | 10/1969 | Ramsey | 55/473 |
| 3,828,530 | 8/1974 | Peters | 55/502 X |
| 3,880,625 | 4/1975 | Shook | 55/473 |
| 4,371,386 | 2/1983 | DeVecchi | 55/338 |

FOREIGN PATENT DOCUMENTS

| | | |
|---|---|---|
| 3526407 | 2/1986 | Fed. Rep. of Germany . |
| 3837967 | 5/1990 | Fed. Rep. of Germany . |
| 4021460 | 1/1992 | Fed. Rep. of Germany ...... 454/158 |
| 2311485 | 12/1976 | France . |
| 1426397 | 2/1976 | United Kingdom ................... 55/473 |
| 1553108 | 9/1979 | United Kingdom . |
| 2224828 | 5/1990 | United Kingdom . |

*Primary Examiner*—Harold Joyce
*Attorney, Agent, or Firm*—Evenson, McKeown, Edwards & Lenahan

[57] ABSTRACT

In the case of a multi-part housing of a heating or air-conditioning system, there is provided, in order to prevent the passage of an unfiltered portion of air conveyed by a fan, a space receiving the leakage air produced, which space is connected to the suction side of the fan. In order to obtain a modular unit which is economical in terms of installation space, each receiving air leakage is formed by the fact that a wall area of the suction housing is attached in one piece to a bottom part of the housing. The channel thus produced is covered by an outwardly pointing flange area of the suction housing top part, which forms, on the pressure side, connected to a bar separating, on the housing side, the pressure area from the suction area of the fan, the top part of the bottom part of the housing.

3 Claims, 3 Drawing Sheets

MULTI-PART HOUSING OF A HEATING OR AIR-CONDITIONING SYSTEM IN A MOTOR CAR

BACKGROUND AND SUMMARY OF THE INVENTION

The invention relates to a multi-part housing of a heating or air-conditioning system in a motor car. The housing has a fan disposed on the air-intake side, downstream of which fan there is connected a filter which retains, in particular, odors and is sealed in relation to the housing. A suction housing is mounted at a distance upstream of the housing. Leakage air which enters at a joint in the housing and escapes at the filter seal, passes into the space between the housing and the suction housing and is led to the suction side of the fan.

A housing configuration of this type, in which unfiltered air is effectively prevented from reaching the passenger compartment, is known from German patent document DE 38 37 967 A1. The housing section accommodating the fan and the filter protrudes through an opening in the end wall into an aggregate chamber which is mounted upstream and the suction housing is secured to the end wall on the aggregate-chamber side.

An object of the invention is to reduce the complexity of assembly and to provide a prefabricated modular unit which can be installed, in a particularly space-saving manner, on the passenger-compartment side.

This object is achieved in the case of a multi-part housing of a heating or air-conditioning system in a motor car of the type having a fan disposed on an air-intake side, downstream of which fan there is connected a filter which retains odors and is sealed in relation to the housing by filter seals, and a suction housing mounted at a distance upstream of the housing, wherein leakage air which enters at a joint in the housing and escapes at the filter seal passes into the space between the housing and the suction housing and is led to the suction side of the fan, wherein the space receiving the leakage air is in each case formed by a wall area of the suction housing bottom part attached in one piece to a bottom part of the housing, so that a channel is produced which is covered by an outwardly pointing flange area of the suction housing top part. A bar separating the top part of the bottom part of the housing on the housing bottom side separates the pressure area from the suction area of the fan.

Other objects, advantages and novel features of the present invention will become apparent from the following detailed description of the invention when considered in conjunction with the accompanying drawings.

DETAILED DESCRIPTION OF THE DRAWINGS

Figure 1:
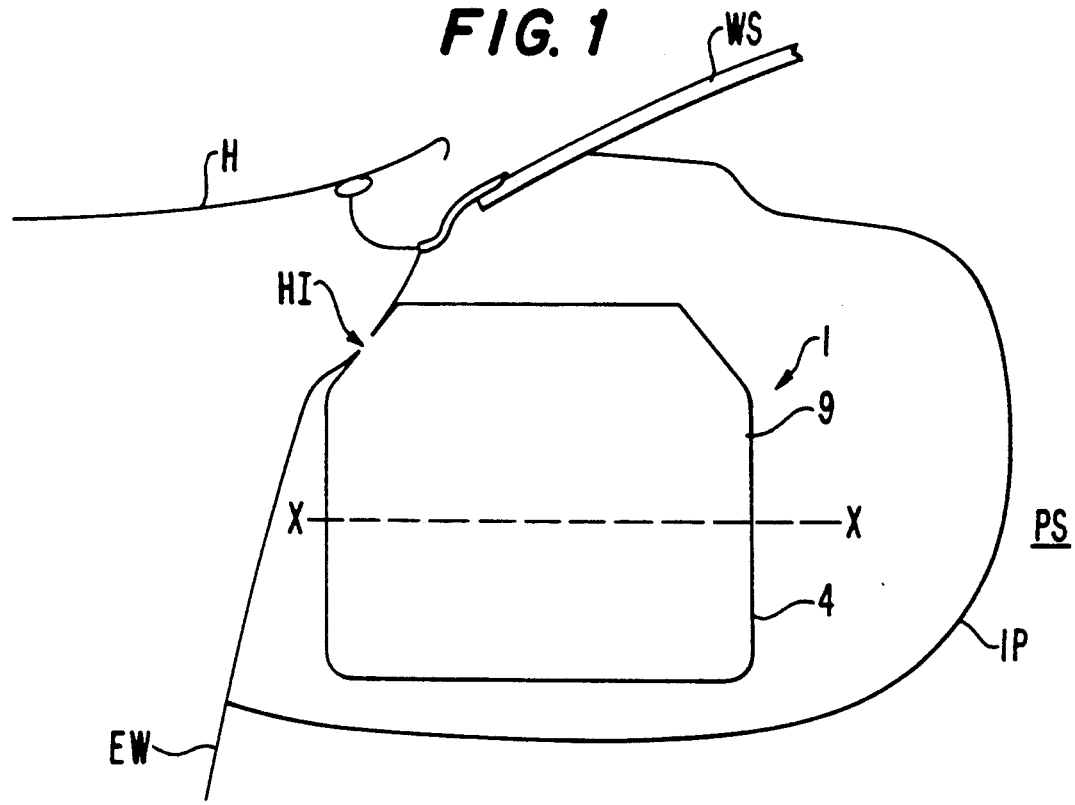
FIG. 1 is a side schematic sectional view depicting the location of a multi-part housing of a heating or air-conditioning system in a motor car, constructed in accordance with preferred embodiments of the present invention.

FIG. 1 schematically depicts the location of the multi-part type housing 1 for a fan and filter of a vehicle air-conditioning system. The housing 1 is disposed between the instrument panel IP at the passenger space side PS and the engine space end wall EW and engine space covering hood H and windshield WS of the vehicle. The multi-part type housing 1 includes a top housing part 9 with an air inlet AI, which is attached to a bottom housing part 4 along a separation plane X. The housing 1 is configured to house a fan 2 and a filter 3 (see FIG. 4). Housing 1 can also house other not shown aggregates such as heat exchangers and condensers of a heating and/or air-conditioning system.

Although not shown as such in the drawings, the bottom housing part 4 is itself constructed of multi-part construction with a bottom portion serving as an end cap for accommodating assembly of aggregates in the housing. Since the present invention relates to the configuration of the top and bottom housing parts 4 and 9 adjacent the separation plane X, the other details of the housing are not included herein in order to not obscure the present invention.

Figure 2:
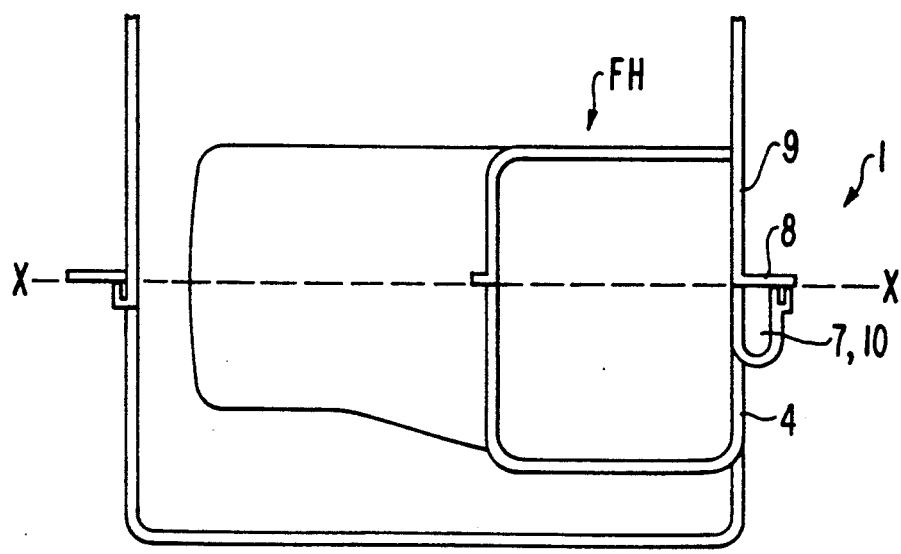
FIG. 2 is a schematic sectional view along line II—II of FIG. 4.
Figure 3:
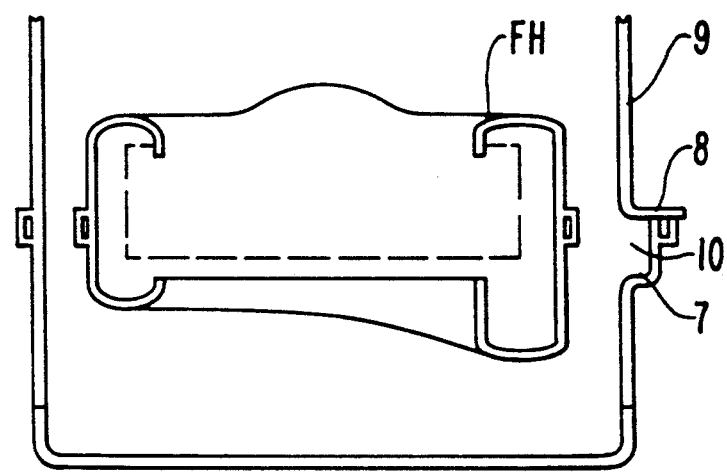
FIG. 3 is a schematic sectional view along line III—III of FIG. 4.
Figure 4:
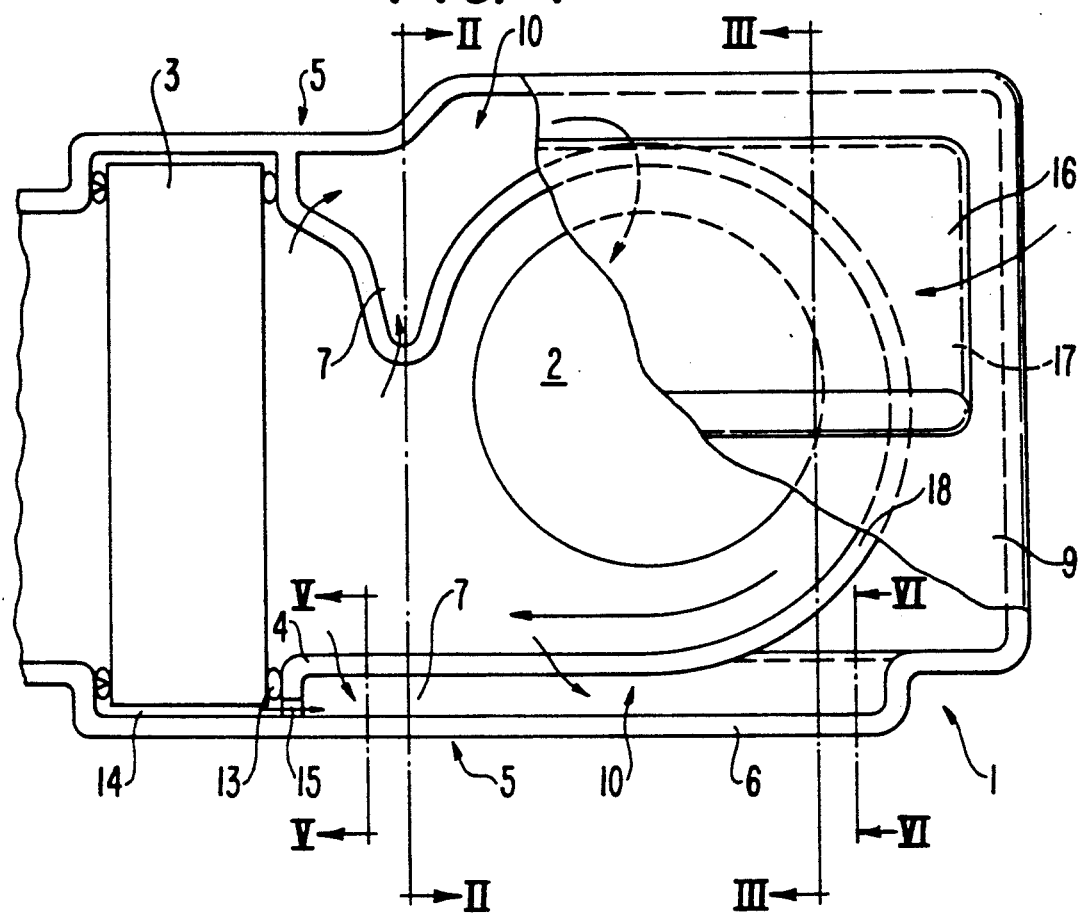
FIG. 4 is a top, partially broken away schematic view of a housing section for a fan and a filer, constructed in accordance with a preferred embodiment of the invention.
Figure 5:
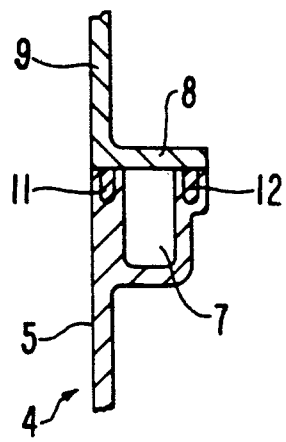
FIG. 5 is a sectional view of a detail taken along line V—V of FIG. 4.
Figure 6:
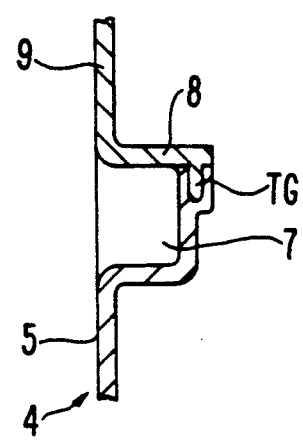
FIG. 6 is a sectional view of a detail taken along line VI—VI of FIG. 4.

FIGS. 2 and 3 only very schematically depict the location of features o the housing structure discussed in more detail with respect to FIGS. 4-6.

Housing 1 is provided with a bottom part 4 to which there is in each case attached in one piece, on the pressure side of the fan 2, a wall area 5 of a suction housing 6. As a result, channels 7 are created which, as can be seen from FIGS. 2, 3, 5, and 6, are covered by an outwardly pointing flange area 8 of the housing top part 9, so that in each case a space 10 is produced which is connected to the suction side of the fan 2. In order to minimize, on the one hand, the incidence of leakage air and, on the other hand, also the interior-air intake rate, there are provided, according to FIG. 5, seals 11 and 12 which make contact with the flange area 8. It is also contemplated, however, to use a tongue and groove connection in place of seals 11 and 12, which produces, in addition to an adequate sealing effect, also an exact positioning of the housing bottom part 4 and the housing top part 9. FIG. 6 shows a tongue and groove connection TG of a seal as an alternative embodiment, as well as depicting the opening of the duct 7 to the suction side of the fan at the location of section line VI—VI of FIG. 4.

On the air-intake side of the filter 3, there is configured, in connection with a seal 13, an annular space 14, which is connected by means of a branch duct 15, via one of the spaces 10, to the suction side of the fan 2. The suction housing top part 9 exhibits a fresh-air opening 17 which can be closed off by a valve 16, to which opening fresh air is supplied via air inlet AI (FIG. 1). On the fan side, a bar 18 separating the pressure area from the suction area of the fan 2 is attached to the bottom part 4, which, in interaction with the mounted suction housing top part 9, represents the boundary line with respect to its section forming the top part of the bottom part 4 of the housing 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Multi-part housing of a heating or air-conditioning system in a motor car of the type having a fan disposed on an air-intake side, downstream of which fan there is connected a filter which retains odors and is sealed in relation to the multi-part housing by filter seals, a suction housing mounted at a distance upstream of the multi-part housing, and the multi-part housing having joints therein, wherein leakage air which enters at a joint in the multi-part housing and escapes at the filter seal passes into a space between the multi-part housing and the suction housing and is led to the suction side of the fan, wherein the space receiving the leakage air is in each case formed by a wall area of the suction housing bottom part attached in one piece to a bottom part of the multi-part housing to provide a channel covered by an outwardly pointing flange area of the suction housing top part.

2. Multi-part housing according to claim 1, wherein on fan sides, a bar separating the pressure area from the suction area of the fan is attached to the bottom part of the multi-part housing and interacts with the top part to form the boundary line at an upper portion of the bottom part.

3. A vehicle passenger space air-conditioning multi-part housing for housing a fan and an odor absorbing filter disposed downstream of the fan and upstream of the vehicle passenger space, said housing including a lower housing part and an upper housing part which are connected along a common separating plane, wherein the upper and lower housing parts include respective integrally formed sections which form a leakage air channel leading from adjacent the filter to a position upstream of the fan, wherein the upper housing part includes an outwardly facing flange which forms the top of the leakage air channel, and wherein the lower housing part includes a first U-shaped section which mates with the flange to form a closed channel section leading from adjacent the fan and a second L-shaped section which mates with the flange to form a laterally open channel section opening to an intake side of the fan.

* * * * *